Jan. 7, 1969 P. C. GOLDMARK 3,420,967

DISC RECORDING AND REPRODUCING SYSTEM

Filed July 1, 1963 Sheet 1 of 2

INVENTOR.
PETER C. GOLDMARK

BY
Brumbaugh, Free, Graves & Donohue
his ATTORNEYS

INVENTOR.
PETER C. GOLDMARK
BY
Brumbaugh, Free, Graves & Donohue
his ATTORNEYS

United States Patent Office 3,420,967

Patented Jan. 7, 1969

3,420,967

DISC RECORDING AND REPRODUCING SYSTEM

Peter C. Goldmark, Stamford, Conn., assignor to Columbia Broadcasting System, Inc., New York, N.Y., a corporation of New York Filed July 1, 1963, Ser. No. 291,915

U.S. Cl. 179—100.4 2 Claims

Int. Cl. G11b 3/00

ABSTRACT OF THE DISCLOSURE

The system of this invention provides means for recording information upon a disc, in less time than the playback time, by multiplying the normal frequency of the input information signal and the normal speed of the cutter turntable by a common factor. Signal input frequencies are filtered so that the high frequencies of the multiplied signal do not exceed the frequency range of the recording apparatus. The system also provides records having narrow playing grooves and wider lead-in grooves, and reproducing apparatus with a pick-up arm mounted to move only in the plane of the record and counterbalanced to be insensitive to shock and sudden accelerations.

This invention relates to recording and reproducing methods and apparatus, and more particularly to such a system in which the program material is recorded in extremely narrow, closely spaced grooves on the surface of a disc record playable at very slow speeds.

The advantage of fine groove and slow speed recording have long been appreciated in the recording art and the once conventional 78 r.p.m. record speed has been largely replaced by speeds of 45, 33⅓ and 16⅔ r.p.m. Besides permitting noticeable improvements in fidelity to be achieved, the finer groove and slower speed recording technique allows a great deal more program material to be recorded on a disc of a given size. This has minimized the annoying necessity of changing records, either manually or automatically, with its attendant breaks in continuity.

Although it has been recognized that it would be desirable to decrease record speeds even lower than 16⅔ r.p.m. recording techniques thus far developed have rendered it unfeasible to use lower speeds in recordings intended for mass distribution. Records for playback at 8⅓ r.p.m. have been produced for limited purposes, but heretofore have been considered economically impractical except for special purposes. One of the principal and most bothersome drawbacks lies in the fact that the recording time, i.e., the time necessary to cut the master disc, is as long as the playback time of the finished record. Thus, for example, a 7 inch, 8⅓ r.p.m. record provides two hours of program material on one side, but also takes two hours to cut. This ties up expensive record cutting equipment and manpower for long periods of time. Presently known techniques for cutting records at very low speeds present an additional disadvantage in that the reduction in cutting speed produces a corresponding reduction in recording quality in the lacquer master disc.

It is the primary object of the present invention to provide improved recording and playback techniques and apparatus for use at slow recording speeds which avoids the shortcomings of the prior art systems.

Another object of the invention is to provide an improved slow speed recording system in which the time necessary to record a record side is substantially less than the playback time of the finished record.

Still another object of the invention is to provide such an improved recording system wherein fidelity of the recorded information is maintained at a maximum.

Yet another object of the invention is to provide a playback technique and apparatus particularly suitable for use with records made in accordance with the improved recording technique.

Although not limited to such use, the method and apparatus of the present invention are of particular application in the recording of speech band program material, i.e., a range of audio signals between approximately 100 and 6000 cycles per second. Within this range, human speech can be reproduced with sufficient fidelity for most purposes. As one example of the possible use of records produced by this process, playback devices particularly adapted for manipulation by the blind are currently being made available for playing records for educational purposes. Under those conditions of use, it is desirable that as much playback time as possible to be provided by each side of a record disc so as to minimize the handling of the record and record player by the blind listener. At the same time, it must be relatively simple to insert the playback stylus in the record groove to begin the record playback.

Conventional record cutting equipment has a frequency response ranging from a few cycles to upwards of 16,000 cycles per second, which accommodates substantially all of the range of human hearing. In the usual recording system, the program material is first recorded on a magnetic tape having a band width encompassing all audio frequencies. The tape is then played back at a convenient time to drive the record cutting head and cut the master disc. During the recording process, suitable equalization and limiting is generally provided to increase the signal-to-noise ratio and improve the aesthetic quality of the recording.

In accordance with the present invention, program material is first filtered to eliminate all frequencies above and below a given desired range, 100 to 6000 cycles per second where pure speech is to be recorded, and the filtered signal recorded on tape in the normal manner. During the record cutting process, however, the speed of the tape playback is increased by a multiple dependent upon the frequency response of the cutter head, and the speed of rotation of the record disc on the cutter turntable is rotated at the same multiple of its nominal speed. The result is that the recording time required to complete the master recording is reduced by a factor equal to the multiple of the nominal speed at which the tape playback and rotation of the record disc occur. When a record produced from the master is played back at its nominal speed, the full amount of recorded material will be available from the record with no diminution in quality. Between the tape playback apparatus and the cutter equipment, suitable equalization and limiting are provided to improve the fidelity of the recording.

As will be understood more readily from the following description, recording at the multiple of the nominal speed permits a large amount of information to be recorded in a relatively short time, and furthermore, avoids the loss of quality that accompanies record cutting at the slow nominal speeds.

To further increase the recording capacity of the record, in accordance with the invention, the recording grooves are made extremely narrow and with relatively small spacings or lands therebetween. In the case of an 8⅓ r.p.m. record, it has been found desirable to provide at least 400 record grooves per inch with the ratio of groove width to land width being of the order of between 2 and 3 to 1. To avoid skidding of the playback stylus across the ultra fine grooves, the playback system is provided with a pickup arm mounted to move only in the plane of the record and counterbalanced to be insensitive to shock and sudden accelerations. The stylus-supporting cartridge is mounted in the pickup arm in such a manner that it is normally urged into contact with the record and requires only a slight application of manual pressure to the arm to be disengaged therefrom.

Since the relatively narrow and shallow record grooves may be insufficient to hold the stylus during lead-in periods when the radial velocity of the pickup arm is substantially higher than that during playback, the invention further provides a lead-in groove substantially deeper and wider than the record groove, whereby the stylus may be firmly engaged during the lead-in period. Where the record is divided into a plurality of bands, each representative of a separate recorded selection, the lead-in grooves therebetween may also be deeper and wider. In addition to providing better engagement of the stylus during movement from one band to another, the increased size of the lead-in groove enables the separate bands to be distinguished, either visually, or by touch. Similarly, at the end of the record, the rest groove may be made deeper and wider enabling more positive actuation of a cut-off or record change switch by the movement of the pickup arm.

The invention will be more clearly understood from the following detailed description thereof when read in conjunction with the accompanying drawings in which.

Figure 1:
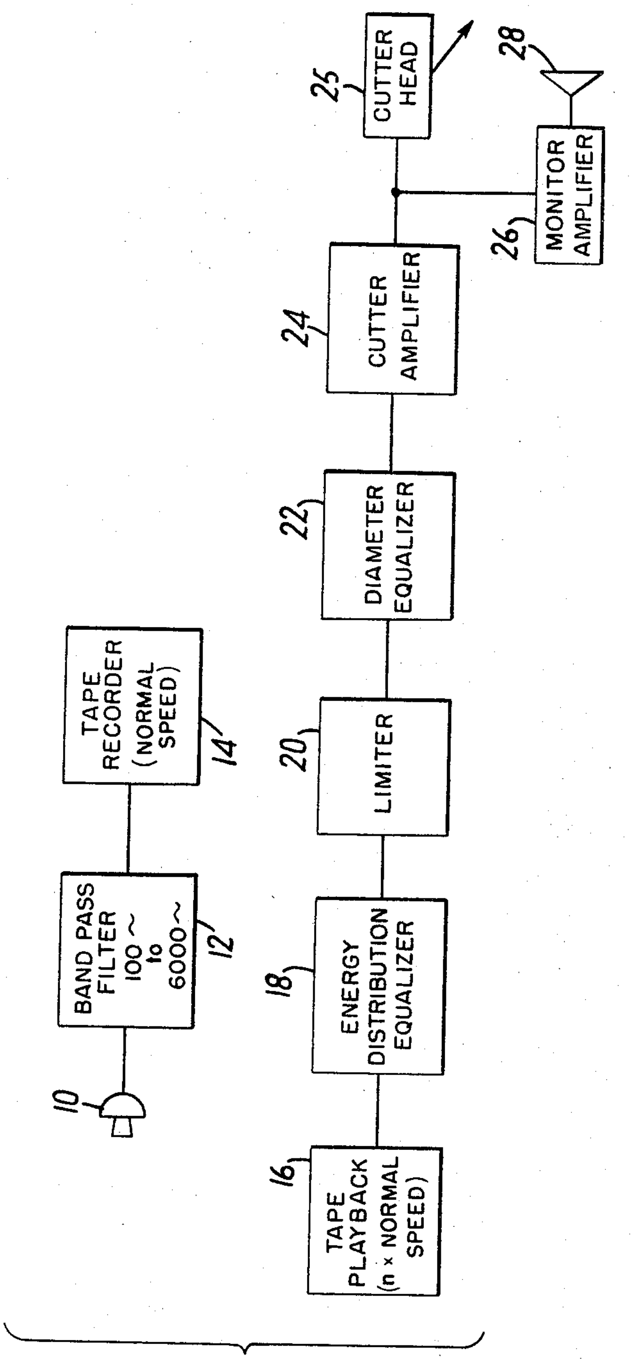
FIGURE 1 is a block diagram of a preferred form of recording apparatus in accordance with the present invention.

Referring now to FIGURE 1, a source of program material, such as a lecture or passage read from a book, is supplied to the microphone 10 of the recording apparatus. The program signals are filtered by band pass filter 12 to remove frequencies below 100 cycles and above 6000 cycles, the intervening frequency band being capable of conveying the spoken word with good fidelity. Removing the very low frequencies reduces the likelihood of overcutting which might otherwise arise during the cutting of the narrow, closely spaced grooves hereinvolved. The filtered signal is then recorded on magnetic tape in the usual manner at normal speeds in tape recorder 14.

When the master disc is to be cut, the tape from recorder 14 is played back by reproducer 16, which operates at a multiple $n$ (which need not be a whole number) of the speed at which the tape was recorded. The value of the multiple $n$ depends upon the characteristics of the cutting apparatus. For example, the usual high fidelity cutting equipment has a frequency response ranging from a few cycles per second to an upper frequency limit of approximately 16,000 cycles per second. If the tape recording, containing frequencies from 100 to 6000 cycles per second, is run at twice its normal speed, ($n=2$) the signal frequencies thereon are effectively doubled and transposed to a range of from 200 to 12,000 cycles per second. This range is still completely within the range of the cutter equipment. Since $n=2$, the same amount of program material is played back by reproducer 16 in half its original recording time and the recording time of the master disc is cut in half. It will be understood, of course, that at the same time as the tape playback speed is doubled, the speed of rotation of the master disc on the cutter turntable will similarly be doubled.

Trebling the tape playback speed in the example chosen would raise the upper effective frequency of the signal to be recorded to 18,000 cycles per second, beyond the range of the cutter apparatus, and the signal would be so greatly distorted at the cutting apparatus as to render it impractical. The speed might be increased by two and a half times, bringing the upper frequency limit to 15,000 cycles or, alternatively, if permissible in given recording, the upper frequency of the band pass filter 12 may be reduced 5000 cycles, in which case an $n$ of 3 would raise the upper frequency limit to 15,000 cycles, again within the band of the cutter apparatus. In general, $n$ is greater than one and is equal to $$\frac{\text{upper frequency response limit to cutter}}{\text{upper frequency limit of program material}}$$

Returning now to FIGURE 1, the output signals of the tape playback 16, which have been increased in frequency over the range of the program material by a factor of $n$, are supplied to an equalizer 18. The device 18 serves, in conventional manner, to maximize the signal-to-noise ratio by equalizing the signal in accordance with the energy distribution of the speech pattern. Inverse equalization would, of course, be provided in the playback apparatus to reproduce the information in a realistic manner.

After the first equalization, sudden amplitude peaks are eliminated by limiter 20, and the limited signals are then subjected to a second equalization in diameter equalizer 22. This network modifies the signals to compensate for the variation in linear velocity of the cutting and playback stylii between the outer and inner portions of the record, the high frequencies being boosted near the inside grooves of the record more than at the outer grooves.

The doubly equalized and limited signals are then supplied through cutter amplifier 24 to the cutter head 25, which operates to cut the groove in the master disc (not shown) in the usual manner. As will be understood, the speed of rotation of the record disc will be a factor of $n$ times its nominal speed. For example if the nominal speed of rotation of the finished record is to be 8⅓ r.p.m., and $n$ equals 2, the master disc would rotate at 16⅔ r.p.m.

The cutter amplifier 24 also provides a portion of the output signal through a monitoring amplifier 26 to speaker 28, which enables the recording engineers to audibly monitor the signal as it is being recorded.

Figure 2:
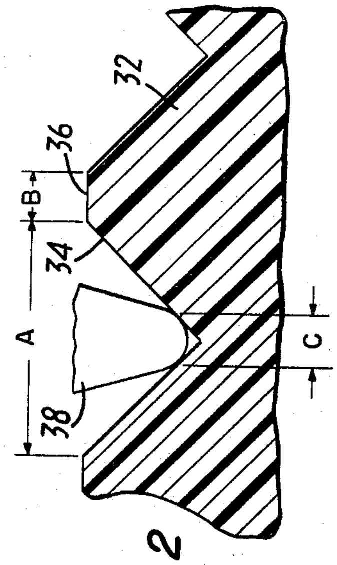
FIGURE 2 is a partial cross-section of a record produced in accordance with the present invention showing the relative dimensions of the record groove and playback stylus.

In FIGURE 2 is shown a partial cross-section through a record indicating the relative dimensions of the record groove and the playback stylus. In accordance with the foregoing example of a record adapted for playback at 8⅓ r.p.m., there will be at least 400 record grooves 34 per inch, and the ratio of groove width A to land width B will be of the order of between 2 and 3 to 1. Purely by way of example, the groove width A may be .001 inch and the land width B may be .0004 inch. To insure maximum fidelity and reliability of operation, the playback stylus 38 should have a tip dimension C small enough to contact the record at least half way down in the groove during the playback. This also provides an additional advantage in that surface scratches on the record will not penetrate the depth at which the stylus contacts the groove.

Figure 3:
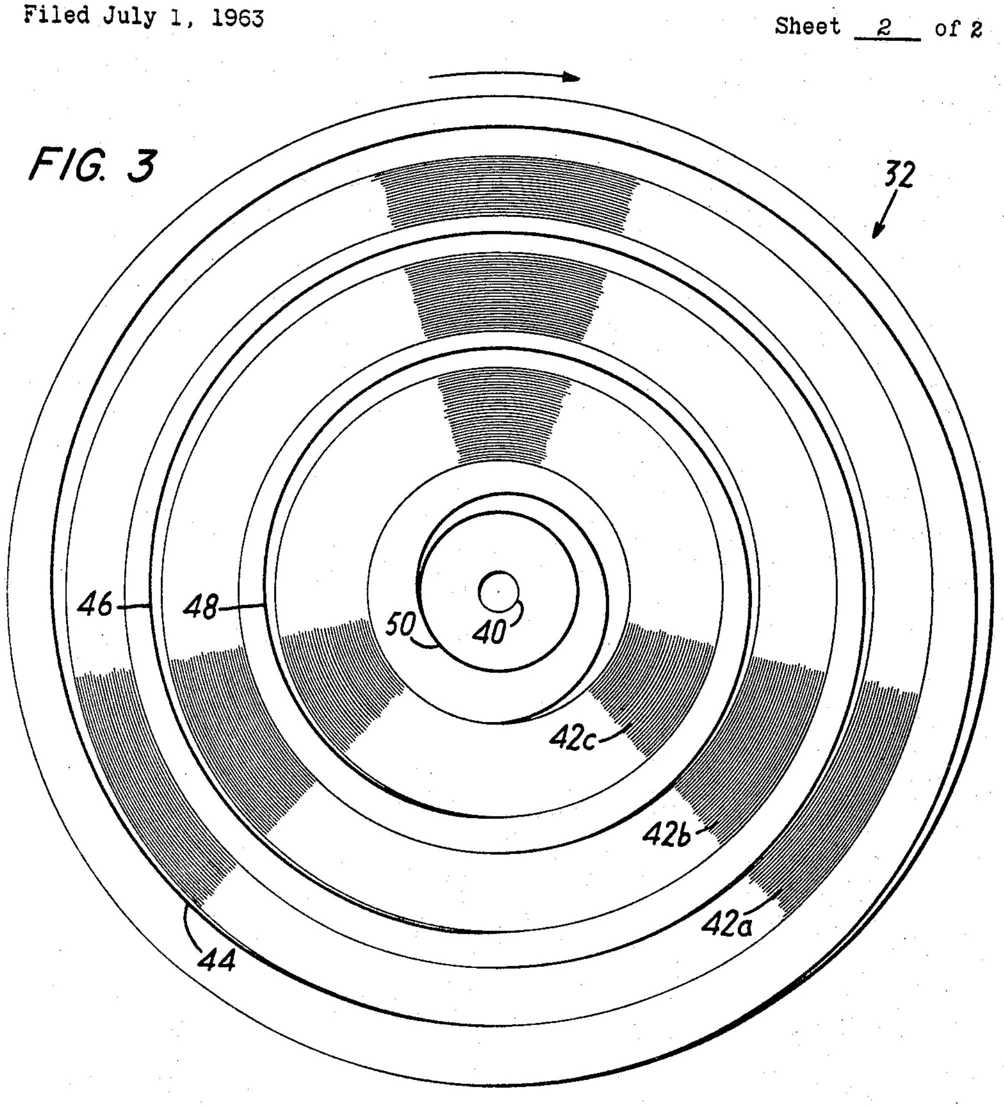
FIGURE 3 is a plan view of the surface of a record produced in accordance with the invention.

FIGURE 3 illustrates the surface of a record produced in accordance with the present invention. As shown, the record 32 includes a plurality of bands, 42*a*, *b* and *c*, each of which may have a different selection recorded therein. Within each band, the record grooves are spaced in accordance with the values discussed above, i.e., at least 400 grooves per inch with the ratio of the groove width to land width being of the order of from between 2 and 3 to 1.

To facilitate initial engagement of the playback stylus with the record, a lead-in groove 44 is provided adjacent the outer edge of the record and additional lead-in grooves 46 and 48 are provided between the respective recorded bands. Lead-in groove 46 provides for relatively rapid movement of the stylus between bands 42*a* and 42*b* and lead-in groove 48 connects band 42*b* to 42*c*. A finish or rest groove 50 is provided at the end of band 42*c*, furnishing a rest position for the pickup arm at the conclusion of the playback and also causing relatively rapid radial motion of the playback arm towards the spindle hole 40 of the record for actuating a shut-off switch or a record changing mechanism in conventional manner.

As indicated by the thickness of the lines used to represent them, the lead-in grooves 44, 46, 48 and the rest groove 50, or any one of them, are made substantially deeper and wider than the record grooves within the bands 42*a*, *b* and *c*. The increased size of the lead-in grooves serves a two-fold purpose. Firstly, they provide more positive engagement of the playback stylus during the lead-in periods when the rapid radial motion imparted to the playback arm might otherwise cause the stylus to skid across the record surface. This is of particular importance where the normal record grooves are narrow and shallow as discussed hereinabove.

In addition, the lead-in grooves 46 and 48 between the separate recording bands serve as means of identifying and locating the individual bands. In the case of a blind person for example, the relatively large lead-in grooves enable him to determine, by touch, the beginning and end of each of the bands. They also enable the separate bands to be more readily distinguished visually.

Finished records of approximately 7 inches in diameter are produced by the foregoing technique with a playback speed of approximately 8⅓ r.p.m. Maximum and minimum diameters of the speech grooves on the record surface are established at 6⅝ inches and 3¾ inches respectively, which, in conjunction with a pitch of 700 lines per inch provide a replay time of two hours per side. Utilizing an $n$ of 2 as discussed above, the actual cutting time of the master record was reduced from 2 hours to 1 hour.

Figure 4:
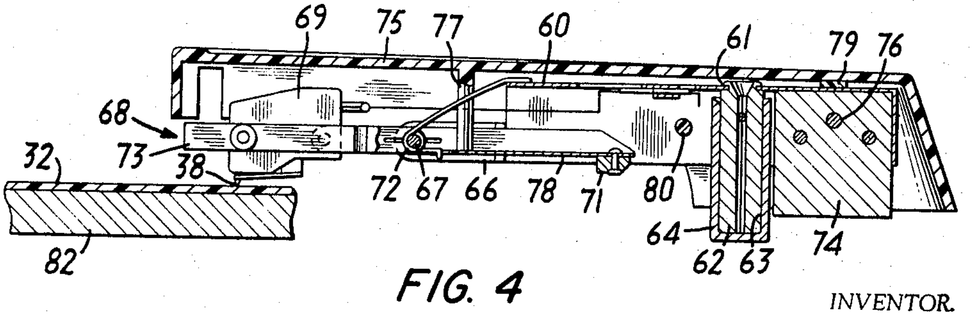
FIGURE 4 is a section through a pickup arm and turntable in accordance with the invention, suitable for playback of the record of FIGURE 3.

To enable proper playback with the narrow grooves provided in accordance with the invention, it is necessary to utilize a light weight, well balanced tone arm. A device such as described in U.S. Patent No. 3,044,783, granted July 17, 1962, to D. P. Doncaster, for "Phonograph Pickup" and assigned to the present assignee, would be suitable, and is illustrated in FIGURE 4. The pickup comprises an arm 60 staked or otherwise secured at 61 to a vertical shaft 62. The shaft 62 is adapted to be received in a bore 63 formed in a support member 64 carried by a board which supports the pickup and the turntable 82 in the usual manner. The record 32 is shown in playback position on the turntable 82.

The arm 60 is provided with a pair of oppositely disposed, forwardly extending portions 66 between which is journaled a pivot pin 67 adapted to support a rocker arm 68 at a location intermediate its ends. Secured to the forward end of the rocker arm 68 is a conventional cartridge assembly 69, which includes a stylus 38, and mounted at the other end is a counterbalance weight 71. Normally, the cartridge assembly 69 is urged towards the surface of a record to be played by a torsion spring 72 on the pivot pin 67. The rocker arm 68 carries a forward extension 73 which may serve as guide means for locating the starting position of the record.

Secured to the rear end of the arm 60 is a mass 74 which serves to counterbalance the rocker arm assembly 68. The arm 60 and rocker arm assembly 68 are covered by a shell member 75 which is mounted on a pivot 76 extending horizontally through the mass 74. The shell 75, which may be of a suitable plastic material, has a downwardly depending member 77 adapted normally to rest on platform 78 comprising part of the rocker arm assembly 68 nearest the shaft 62. The tension in the spring 72 and the relative masses of the parts are selected so that with the shell 75 resting on the platform 78, as shown in the figure, the stylus 38 will exert the proper pressure against the record groove. In the case of the narrow grooves of the present invention, this stylus pressure should not exceed 4 grams. Desirably, damping pads 79 and 80 made of a material such as polyurethane foam are provided as shown.

A suitable damping material, such as silicone grease, is interposed between the shaft 62 and the bore 63 so as to introduce mechanical resistance to turning of the arm 60 in the plane of the record. The entire pickup arm assembly is of so little mass that the movement of the arm is governed by the mechanical resistance introduced by the silicone grease rather than by the inertia of the system. Accordingly, the pickup is insensitive to shocks and will track in the record groove correctly at the low speed and fine groove pitch discussed above.

It will be apparent from consideration of FIGURE 4, that the tone arm structure is movable only in a plane parallel to the turntable surface about the vertically disposed shaft 62. To raise the stylus out of engagement with the record surface, all that is required is a relatively slight pressure applied downwardly on the shell 75 of the pickup housing at any point forwardly of the pivot 76. When such pressure is applied, the member 77 presses downwardly on the right hand side of the rocker arm, thereby pivoting the arm about the pin 67 and raising the cartridge 69. The entire pickup arm may then be rotated out of playback position about its shaft 62. When used in conjunction with the type of record shown in FIGURE 3, it will be readily appreciated that the pickup arm enables quick and sure positioning on the record by means of the sense of touch alone, such as is necessary in equipment intended for use by the blind.

Although the invention has been described in connection with the recording of speech signals having an upper frequency level of approximately 6000 cycles per second, it will be realized that the principles of the invention may be applicable to any signal range. Although it may be convenient in the usual case to use the highest integral value of $n$ falling wthin the prescribed limits, fractional parts of integral multiples may also be employed, depending upon the sensitivity of the speed control of the tape playback device and the recording cutter turntable. In either case, the principle of the invention remains the same.

Various modifications of the above-described invention will occur to those skilled in the art, and the specific embodiments described are to be deemed as limited only by the scope of the following claims.

I claim:

1. A method of recording information signals on a master disc record with record cutting apparatus having a given upper frequency response limit, said master disc record adapted to provide playback at a predetermined nominal speed, comprising the steps of filtering said information signals to remove all frequencies above and below a preselected band of frequencies in the speech band, recording said filtered signals at normal speeds on magnetic tape, playing back the signals recorded on said magnetic tape at a multiple of the magnetic tape recording speed such that the highest frequency of the played back signals is no higher than the upper frequency response limit of said cutting apparatus, equalizing said played back signals in accordance wtih the energy distribution pattern of human speech, limiting said signals to reduce sudden amplitude peaks, further equalizing said signals to compensate for the difference in linear speed of the cutting and playback styli between the inner and outer grooves of the record, supplying said equalized and limited signals as an input to said record cutting apparatus, and rotating said master disc record during actuation of the record cutting apparatus at said multiple of its nominal playback speed.

2. Apparatus for producing disc records adapted for playback at slow speeds comprising, record cutting apparatus having a given upper frequency response limit for cutting a disc record having a nominal speed of rotation, a source of speech program signals to be recorded, filter means for selecting program signals lying within a frequency band having an upper frequency limit less than the upper frequency response limit of said record cutting apparatus, means for recording said selected program signals on a tape recording medium operating at a predetermined speed, means for playing back said tape recording medium at a multiple of said predetermined speed such that the highest resultant frequency is no higher than said upper frequency response limit of said cutting apparatus, means for equalizing and limiting said played back signals, and means for coupling said equalized and limited signals to said cutting apparatus while the record disc thereon is rotating at said multiple of its nominal speed.

References Cited

UNITED STATES PATENTS

| | | | |
|---|---|---|---|
| 2,563,565 | 8/1951 | Thompson | 179—100.4 |
| 2,921,992 | 1/1960 | Bick | 179—100.4 |
| 2,932,522 | 4/1960 | De Witt | 274—42 |
| 3,025,066 | 3/1962 | Siebert | 274—39 |
| 3,072,753 | 1/1963 | Goldberg | 179—100.2 |
| 3,111,635 | 11/1963 | Skov | 179—100.4 |

OTHER REFERENCES

Howard M. Tremaine: "The Audio Cyclopedia," 1st edition, April 1959, p. 434.

BERNARD KONICK, *Primary Examiner.*

R. F. CARDILLO, *Assistant Examiner.*

U.S. Cl. X.R.

274—46, 42